(No Model.)
E. SOPER.
Thill Coupling.
No. 231,457. Patented Aug. 24, 1880.
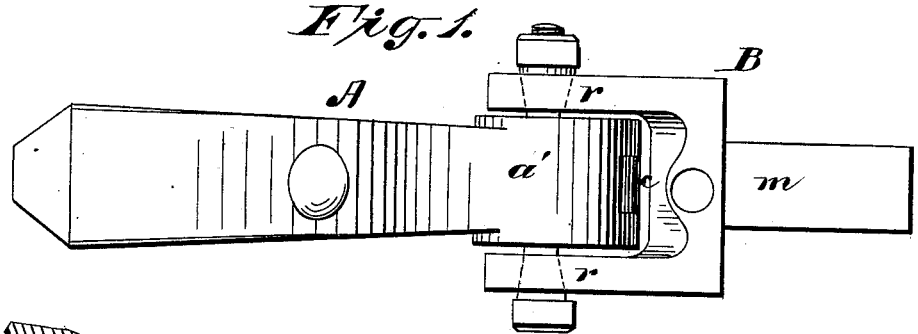
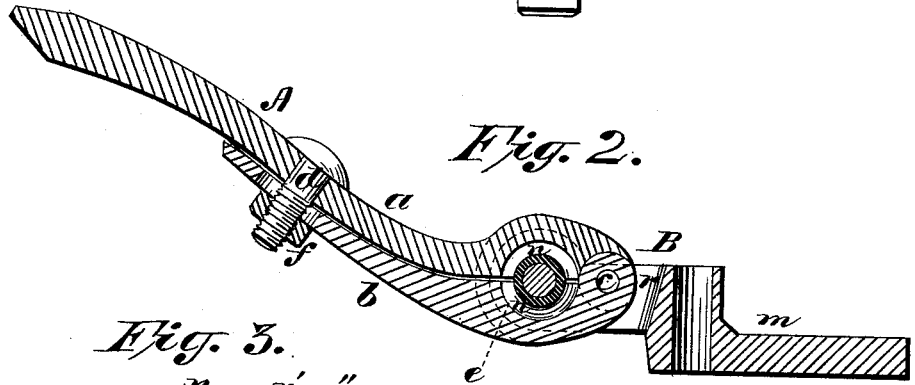
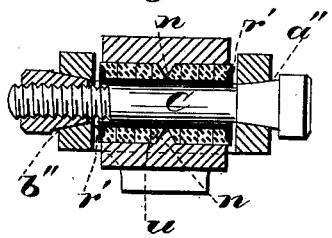
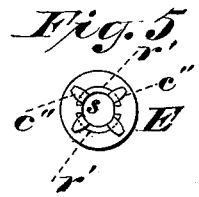
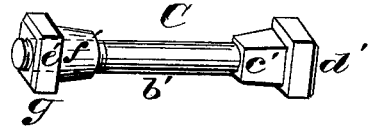
WITNESSES.
H. F. Parker.
Charles J. Cornell
INVENTOR.
Ephraim Soper
PER- James A. Whitney
Atty.

UNITED STATES PATENT OFFICE.

EPHRAIM SOPER, OF BROOKLYN, E. D., NEW YORK.

THILL-COUPLING.

SPECIFICATION forming part of Letters Patent No. 231,457, dated August 24, 1880.

Application filed May 5, 1880. (No model.)

*To all whom it may concern:*

Be it known that I, EPHRAIM SOPER, of Brooklyn, E. D., in the county of Kings and State of New York, have invented certain Improvements in Shaft-Couplings for Carriages, &c., of which the following is a specification.

This invention is designed to provide a carriage-clip which shall be perfectly noiseless and not liable to get out of order through any wear or displacement of its parts; and to this end the invention comprises certain novel combinations of parts whereby the bolt of the clip is prevented from getting loose in the lugs of the clip wherein said bolt is placed; also whereby the shaft-iron is prevented from moving laterally upon the bolt or coming in contact with the lugs of the clip; also whereby provision is made for preventing the wear of the packing interposed between the shaft-iron and the clip.

Figure 1 is a plan view of a shaft-coupling embracing my said invention. Fig. 2 is a vertical longitudinal sectional view of the same. Fig. 3 is a vertical transverse sectional view thereof, taken in the line of the bolt by which the shaft-iron is connected with the clip. Fig. 4 is a detached perspective view of the said bolt and its accompanying nut; and Fig. 5 is an end view of the cylindric packing interposed between the bolt and the shaft-iron.

A is the shaft-iron, composed of two parts, *a b*, pivoted together, as shown at *c*, each of its parts having a transverse semi-cylindric recess, which, when the two parts *a b* are brought together, are closed to constitute the socket *e*. When the two parts are thus closed and the shaft-iron is applied in place upon the clip, as hereinafter explained, the said two parts are secured together by a bolt, *d*, and nut *f*, and pass through suitable slots or openings in the said parts. Projecting inward from each of the opposite portions of the socket *e* of the shaft-iron A, about equidistant from the opposite ends of the said socket, is an inwardly-projecting rib or spline, *n*, which is triangular in its cross-section, as shown more clearly in Fig. 3.

B is the clip, having the usual shank *m* and the lugs *r*. The distance between the lugs *r* is greater than the width of the adjacent portion *a'* of the shaft-iron A. In other words, the said shaft-iron at the part just indicated is narrower than the space between the lugs *r*, the purpose of which will hereinafter appear.

C is the bolt, of cylindric form except at the headed end, which is pyramidal in shape, as shown at *c'*, in addition to the usual square-head portion *d'*, its opposite end being provided with the usual screw-thread, upon which is screwed a nut, *g*, which, in addition to the usual square portion *e'*, has a conical part, *f'*.

One of the lugs *r* of the clip B has a socket, *a''*, of a shape corresponding to the pyramidal parts *c'* of the head of the bolt, and in like manner the opposite one of the lugs *r* has a conical bearing, *b''*, conforming to the shape of the conical part *f'* of the nut *g*. When the nut is passed through the aforesaid bearing of the lug *r*, the pyramidal part *c'* of the head being fitted into the correspondingly-shaped socket *a''*, and the nut *g* being turned and fitted into the correspondingly-shaped conical socket *b''*, it follows that the head and the nut will be drawn into their corresponding sockets very snugly and closely, and that any wear which may occur in the bearing may be quickly compensated for by simply tightening the nut, this being by the pyramidal form of the part *c'* of the head of the bolt, which prevents the bolt from torsion, even when considerable force is exerted upon the bolt in drawing home the head and the nut to their respective bearings, as just herein explained.

E is a leather packing, formed preferably of sole-leather, of cylindric form, designed to be placed upon the bolt C, as represented in Fig. 3, when the said bolt is placed in position in the clip, as hereinbefore explained. In order that this packing E may hold snugly and tightly upon the bolt and be prevented from rapidly wearing out thereon, it is lined with two oppositely-placed semi-cylindric metallic plates, *r'*, which are held in position by small tongues *c''*, formed at their outer ends, and turned over and clinched into the adjacent surface or substance of the packing itself, as represented in Figs. 3 and 5.

When the bolt C is forced into and through the bore *s* of the packing E, as represented in Fig. 3, the leather of which the packing E is composed is stretched or strained, and thereby compresses the plates *r'* against the surface of the bolt C, thus compensating for any wear which may occur in the plates r', and at the same time holding the plates so snugly against the bolt that the packing itself cannot rattle.

Formed circumferentially in the packing E, midway between its ends, is a triangular groove, u, into which the triangular ribs or splines n of the shaft-iron A are fitted when the said shaft-iron is attached in place, as represented in Figs. 1, 2, and 3, as hereinbefore explained. The splines n, fitting into this triangular groove, prevent the lateral movement of the shaft-iron upon the bolt, and in case of the wearing away of the surface of the said groove the loss may be compensated by more closely tightening together the two parts a b of the shaft-iron A. Inasmuch as the lateral movement of the shaft-iron upon the packing E is prevented, as just explained, and inasmuch as the adjacent end of the shaft-iron is narrower than the space between the lugs, it follows that the said shaft-iron cannot strike laterally against the lugs, and any noise from such cause is, of course, thereby prevented.

What I claim as my invention is—

1. The bolt having a pyramidal head at one end and furnished with a conical nut at the other, in combination with the clip having one of its ears constructed with a pyramidal socket and the other with a conical socket, whereby the bolt is snugly and securely connected and supported at its ends, with a straight parallel central portion adapted to receive the shaft-iron, substantially as and for the purpose herein set forth.

2. The cylindric leather packing constructed with a central triangular circumferential groove, in combination with the clip, the bolt, and the hinged shaft-iron constructed with the internal triangular spline adapted to fit into the groove of the leather packing, substantially as and for the purpose herein set forth.

3. The cylindric leather packing provided internally with the two opposite semicircular bearing-plates attached at their extremities to the said packing by the outwardly-turned spurs, in combination with the clip, the bolt, and the shaft-iron, all substantially as and for the purpose herein set forth.

4. The combination of the clip, the shaft-iron having a socket narrower than the space between the lugs of the clip and constructed with the internal triangular spline, the transverse bolt, and a packing or bearing constructed with a triangular circumferential groove to receive the spline of the shaft-iron, whereby the shaft-iron is held against lateral movement without contact with the ears or lugs of the clip, all substantially as and for the purpose herein set forth.

EPHRAIM SOPER.

Witnesses:
H. F. PARKER,
J. A. WHITNEY.